Oct. 23, 1934.     L. A. WATTS     1,977,959
SELF LUBRICATING BEARING

Filed Dec. 5, 1931

Inventor
L. A. Watts
by G. P. Dilwein
Attorney

Patented Oct. 23, 1934

1,977,959

UNITED STATES PATENT OFFICE 1,977,959

SELF-LUBRICATING BEARING

Leon A. Watts, Atlanta, Ga., assignor to Allis-Chalmers Manufacturing Company, Milwaukee, Wis., a corporation of Delaware Application December 5, 1931, Serial No. 579,212

7 Claims. (Cl. 308—126)

This invention relates in general to the art of machine elements and relates more specifically to the art of self-lubricating bearings for rotary shafts.

An object of the invention is to provide a shaft surrounding casing with means for effectively self-lubricating the bearing for a rotary shaft, mounted within said casing.

Another object of the invention is to provide a self-lubricating bearing as, related above, which will effectively carry out its self-lubricating function irrespective of substantial variations of the inclination of the shaft thereof from the horizontal position and at the same time effectively preclude the escape of oil or other lubricant therefrom.

Various forms of lubricating bearing devices have been devised, whereby the lubricant is retained in proper relation to the bearing parts and its escape prevented, but ordinarily such devices necessitate the location of the bearing in a certain position and undue tilting or inclining thereof defeats the purpose of the arrangement, of which devices having oil rings are a good example.

It is therefore a specific object of this invention to obviate the difficulties mentioned by providing a bearing with a depending tube or tubes of sufficient length to extend well below the level of a body of lubricant suitably confined below the shaft bearing and to provide a pumping action by means of roughened or knurled surface portions of the rotary shaft registering with the tubes to draw continuous streams of lubricant through the tubes to the bearing even though the surface of the lubricant be at a substantial inclination with respect to the axis of the shaft.

A further object of the invention is to provide a self-lubricating bearing, as related above, with means for priming the interrupted surface portions of the shaft, acting as pumps, to enhance the pump action of these portions at the start of rotation of the shaft from rest and to constantly maintain these shaft portions well wetted with the lubricant at all times.

Another object of the invention is to provide a self lubricating bearing which is simple in construction, effective in operation, and economical of construction.

Other objects and advantages of the present invention will become apparent from a consideration of the detailed description in the specification and of the drawing accompanying the same and forming a part thereof and on which like reference numerals refer to the same elements or parts in the views.

Figure 1:
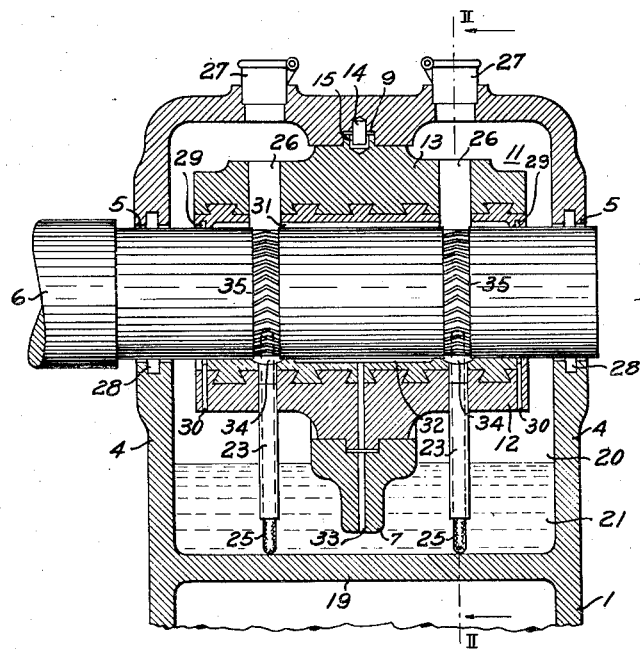
Fig. 1 is a central vertical sectional view of a self-lubricating bearing constructed according to this invention, the shaft and lower pedestal portion being broken away.
Figure 2:
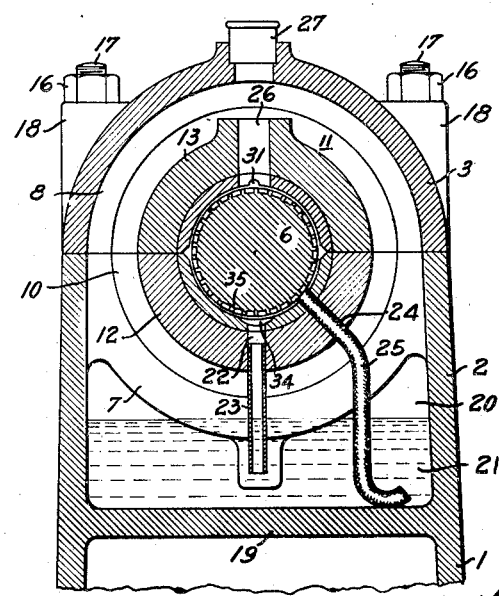
Fig. 2 is a vertical sectional view of the bearing shown in Fig. 1 taken on a diametrical plane passing through one of the depending lubricant transmitting tubes thereof and indicated by the line II—II of Fig. 1 looking in the direction of the arrows.

A standard 1 provides a shaft surrounding casing consisting of a lower casing portion 2 and a detachable upper casing portion 3. The end walls 4 of the shaft surrounding casing are provided with registering apertures 5 through which a rotary shaft 6 is extended. The casing portions 2 and 3 are divided preferably on a plane passing through the centers of apertures 5. A saddle 7 formed integral with the side walls of the lower casing portion 2 registers with a semi-circular projection 8 of the upper casing portion 3. An annular groove 9 is provided by semi-circular alined recesses in projection 8 and saddle 7 in which is received an intermediate, cooperating annular flange 10 of a split bearing 11. The bearing 11 similarly comprises a base section 12 and a cap section 13. A pin 14 in the upper casing portion 3 is arranged to have its projecting portion received within a recess 15 in the bearing cap section 13, to prevent rotation of the bearing 11 within the surrounding casing upon rotation of the shaft 6. Nuts 16 cooperate with the outer ends of stud bolts 17 embedded in the lower casing portion 2 and having their projecting portions received within bored bosses 18 of the upper casing portion 3, the nuts 16 being tightly driven home to firmly hold the parts in fixed position.

The lower casing portion 2 is seen divided from the remaining portion of the standard 1 by a partition 19 which cooperates to form a chamber 20 for confining a lubricant 21 below the shaft 6.

The novel means formed in portions of the shaft 6 and cooperating with elements intermediate these shaft portions and the chamber 20 containing the lubricant 21, will now be described.

The base section 12 of the bearing 11 is provided with downwardly directed axially spaced bores 22 designed to receive tubes 23 preferably of copper and of lengths sufficient so that they extend appreciable distances below the normal level of the lubricant 21 in the chamber 20 for the purposes which will presently appear. In the diametrical planes of the bearing including the tubes 23 the bearing base section 12 is further provided with bores 24 which receive end portions of wick members 25 of sufficient lengths to have their other end portions continuously immersed in the lubricant 21. The purpose of these wick members will be fully discussed later on in the description. The bearing cap section 13 is further provided with bores 26 located in said diametrical planes, which serve to form a direct avenue of approach for lubricant 21 admitted through capped fillers 27 provided in the top portion of upper casing 3, at times when it is necessary to replenish the amount of lubricant 21 in chamber 20. The end walls 4 for the shaft surrounding casing are provided with annular cut-offs 28 which may receive suitable annular members snugly surrounding the shaft 6, to prevent escape of lubricant 21 from the interior of the shaft surrounding casing.

Adjacent each end of the bearing 11, the inner or shaft engaging surface thereof is provided with annular recesses 29 communicating with downwardly directed passages 30 formed entirely through the bearing base section 12, which cooperate with suitable, plain sealing members located in the cut-offs 28, to more completely and effectively prevent escape of the lubricant 21 from within the shaft surrounding casing. Intermediate these annular recesses 29 the inner or shaft engaging surface of the bearing cap section 13 is provided with a lubricant conducting groove 31. The inner surface of the bearing base section 12 is likewise provided with a similar groove 32 in open communication with a downwardly directed drain passage 33 extending through the bearing base section 12 and the saddle 7 and forming the intended discharge passages for the pump portions of the self-lubricating bearing. The inner ends of the copper tubes 23 open into a spherical cavity 34 provided in the bearing base section 12.

The shaft 6 in the diametrical planes of these copper tubes 23 is formed in a novel manner. It is first of all slightly undercut at these places, which undercut portions are each provided with a continuous roughened or interrupted surface, (interrupted insofar as that it does not present a smooth continuous cylindrical surface) as shown in the form of herring-bone ribs 35, which may be readily provided on the required portions of the shaft 6, as by knurling these portions continuously around the circumference of the shaft.

With the wick members 25 immersed in the normal body of lubricant 21, as shown, they will constantly serve, due to their capillary action, to transmit sufficient lubricant to the knurled surface portions of the shaft 6, to keep these portions, which function as viscosity shaft pumps, primed, so to speak, so as to provide an effective pumping action immediately upon the start of the rotation of the shaft 6, augmenting therefore the suction effect which may be created by these portions of the shaft due to the mere fact of rotation thereof. The enhanced suction will upon continued rotation of the shaft 6 pull sufficient lubricant 21 through the copper tubes 23, to effectively maintain the shaft engaging surface portions of the bearing 11 continuously wetted by the desired amount of lubricant, and this without much attendant or accompanying splashing of lubricant and escaping thereof from the bearing onto and adjacent the suitable, plain sealing members positioned in the cut-offs 28, serving as the sole means for directly sealing the joint between the shaft 6 and the shaft surrounding casing directly supporting or mounting the self-lubricating bearing 11.

It will be further seen that the self-lubricating function of the bearing is carried out effectively irrespective as to whether the shaft 6 and surrounding casing are removed to an appreciably inclined position from that of the horizontal position thereof shown on the drawing, and that also under these conditions the self-lubricating function of the bearing is carried out without much accompanying leakage of lubricant from the shaft surrounding casing, unless, of course, the inclination of the normal body of the lubricant shown in the drawing is increased so that its surface intercepts or directly extends to the cut-offs 28 provided in the end walls 4 of the shaft surrounding casing.

Further it will be noticed that the function of the ribbed portions of the shaft as affecting the self-lubricating function of the bearing is nowise disturbed and the possibility of escape of lubricant from the shaft surrounding casing lessened, if the shaft is extended through only one end wall 4 of the shaft surrounding casing in which case the end wall not penetrated may be solid in its entirety.

It is to be understood that it is not desired to limit the invention to the exact details of construction and of operation shown and described for various modifications thereof within the scope of the claims may occur to persons skilled in the art to which the invention appertains.

It is claimed and desired to secure by Letters Patent:

1. In combination, a bearing, a shaft having a roughened portion knurled continuously around its circumference within said bearing, means for mounting said bearing and confining a lubricant, means forming a passage communicating with said lubricant and with the circumferential space as determined between the roughened shaft portion and said bearing, and a capillary member immersed in said lubricant and communicating with said space at the bottom half of said bearing, said roughened shaft portion and said passage forming means serving as a viscosity shaft pump.

2. In combination, a bearing, a shaft having a portion knurled continuously around its circumference to provide recesses and projections within the said bearing, means for mounting said bearing and confining a lubricant, means forming a passage communicating with said lubricant and with the circumferential space as determined between the recessed shaft portion and said bearing, and a capillary member immersed in said lubricant and communicating with said space, at the bottom half of said bearing, the shaft portion provided with recesses and projections and the passage forming means serving as a viscosity shaft pump.

3. In combination, a casing having an apertured end wall, a bearing mounted by said casing in alinement with the aperture in the casing end wall, a shaft having a roughened undercut portion knurled continuously around its circumference within said bearing and passing through the aperture in said casing end wall, said casing providing a lubricant chamber below said bearing, means forming a passage opening into a lower layer of the lubricant in the lubricant chamber and communicating with the circumferential space as determined between the roughened shaft portion and said bearing, and a capillary member immersed in the lubricant in said lubricant chamber and communicating with said space at the bottom half of said bearing, the roughened shaft portion and the passage forming means serving as a viscosity shaft pump.

4. In combination, a casing having an apertured end wall, a bearing mounted by said casing in alinement with the aperture in said casing end wall, said casing providing a lubricant chamber below said bearing, a shaft within said bearing and passing through the aperture in said casing end wall, the portion of the shaft surrounded by the bearing being provided with spaced, undercut portions having knurled surfaces, means forming passages opening into a lower layer of the lubricant in the lubricant chamber and communicating respectively with the circumferential spaces determined and provided between the undercut shaft portions and said bearing, and capillary members immersed in the lubricant in said lubricant chamber and communicating respectively with said spaces at points in the bottom half of said bearing, the knurled shaft portions and the said cooperating passages forming viscosity shaft pumps having discharge passages provided in the bearing intermediate the location of said passage forming means.

5. In a self-lubricating bearing, the combination with a bearing housing having a chamber for lubricant, a journal bearing mounted in said housing above the lubricant in said chamber, a passageway communicating with the interior surface of said bearing and extending into the lubricant in said chamber, and a shaft journal cooperating with said bearing and having a continuous circumferentially knurled portion extending entirely around the shaft arranged in the transverse plane of the bearing including the opening of said passageway and constituting when rotating a pump to draw lubricant through said passageway from said chamber to lubricate the bearing.

6. A shaft bearing, comprising a shaft having a journal provided with a circumferentially knurled portion extending continuously around the shaft, a journal bearing arranged to engage said shaft journal to rotatably support it and having a passageway therein opening adjacent to and in the transverse plane of said knurled portion of the journal, and a reservoir for lubricant disposed below said journal bearing and having communication with said passageway whereby lubricant is supplied to said bearing continuously by the pumping action of said knurled portion rotating past the opening of said passageway.

7. A shaft bearing, comprising a shaft having a journal provided with a continuous circumferentially knurled portion extending entirely around the shaft, a journal bearing arranged to rotatably support said shaft journal and having a plurality of passageways therein opening adjacent to and in the transverse plane of said knurled portion of the journal, a reservoir for lubricant disposed below said journal bearing and connected to communicate with one of said passageways, and a wick extending from the lubricant in said reservoir through another of the passageways in said bearing to engage said knurled portion of the journal and wet it with lubricant, whereupon lubricant is supplied to said bearing by the pumping action of said wetted knurled portion rotating past the opening of said first passageway.

LEON A. WATTS.